Patented May 21, 1940

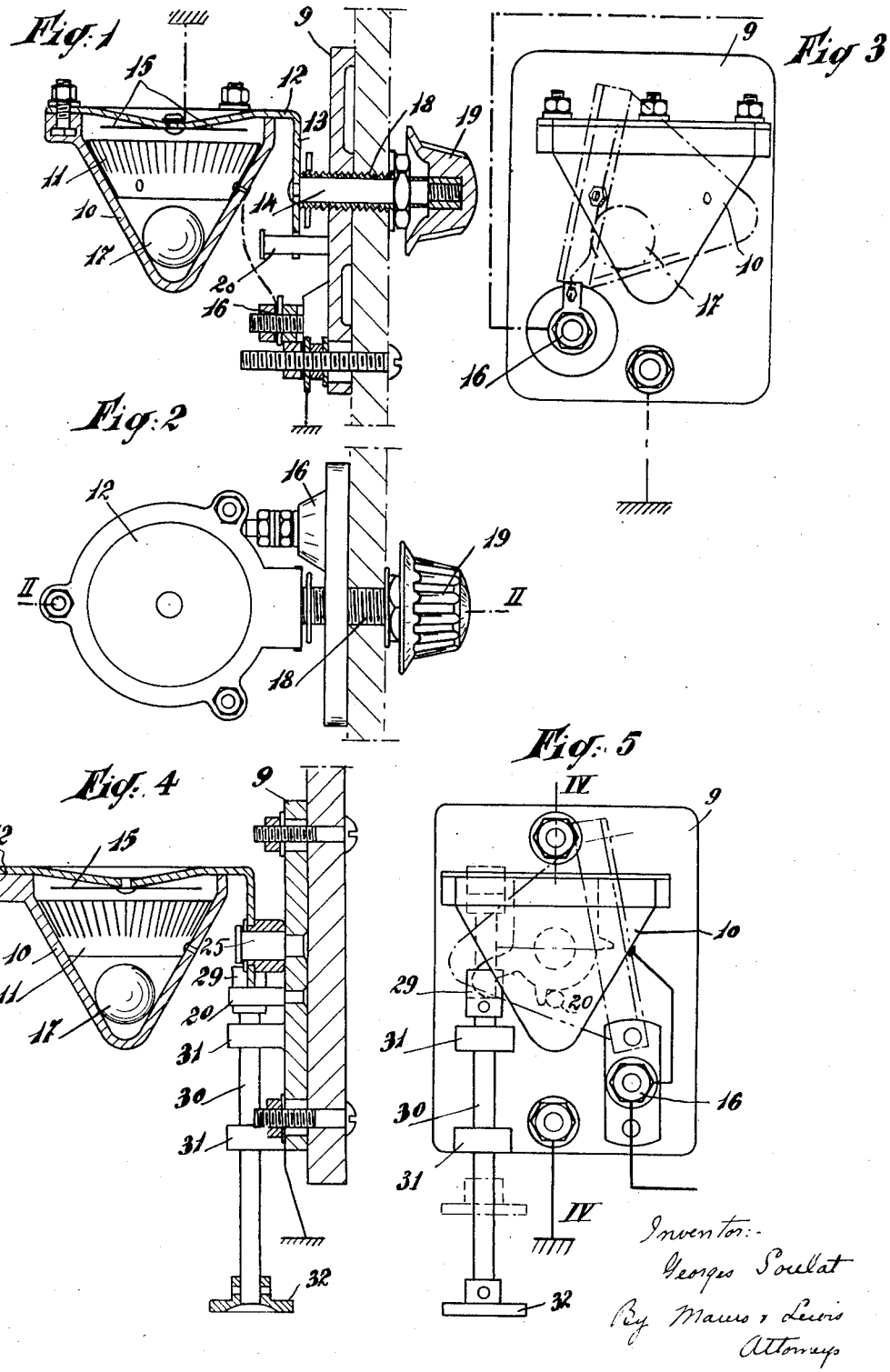

2,201,637

UNITED STATES PATENT OFFICE 2,201,637

GRAVITY SWITCH

Georges Soulat, La Guerche-sur-l'Aubois, France

Original application December 8, 1936, Serial No. 114,822. Divided and this application December 24, 1937, Serial No. 181,689. In France December 20, 1935

2 Claims. (Cl. 200—52)

The present invention, which is a division of my U. S. application Ser. No. 114,822, filed December 8, 1936, now Patent No. 2,174,846 relates to gravity or inertia operated switches.

The chief object of the present invention is to provide a switch capable of being operated both automatically, when the support of the switch is overturned, or undergoes a shock, and manually, when it is desired to close a circuit.

According to the essential feature of the present invention, the switch includes a container, preferably funnel-shaped, and a lid for said container, both of these elements being inserted in the above mentioned circuit and electrically insulated from each other, and a contact piece, such as a ball of an electricity conducting material, movable in said vessel so as to close the circuit between the vessel and its lid under the effect of a shock or when said vessel is overturned, and said vessel is movably carried by said support so as to make is possible to overturn it manually when it is desired to close the circuit.

According to another interesting feature of the present invention, the part of the movable vessel that is of an electricity conducting matter is located in such manner as to be intersected by the axis about which said vessel is pivotable with respect to its support and the conductor through which said circuit is connected to said vessel is fixed to the vessel at the point thereof that is located on said axis, so that rotation of the vessel about said axis does not produce a displacement of said conductor.

Other features of the present invention will result from the following detailed description of some specific embodiments thereof.

Preferred embodiments of the present invention will be hereinafter described, with reference to the accompanying drawing, given merely by way of example, and in which:

Fig. 1 is a vertical sectional view, on the line II—II of Fig. 2, of an embodiment of a gravity and inertia operated switch according to the present invention;

Fig. 2 is a plan view of the switch, corresponding to Fig. 1;

Fig. 3 is an elevational view of the switch, corresponding to Fig. 1;

Fig. 4 is a vertical sectional view on the line IV—IV of Fig. 5, of another embodiment of the switch according to the present invention;

Fig. 5 is a front elevational view of the switch of Fig. 4.

In the following description, it will be assumed, in order to facilitate explanations, that the switch is used in connection with a vehicle, for instance an automobile vehicle, and serves to operate a relay cutting off the main electric circuit of the vehicle when the latter overturns. But it will be readily understood that this is only one application of the invention and it should not be construed as limiting in any way the scope of the invention.

As shown by Figs. 1 to 3, the switch is mounted on a plate 9 adapted to be fixed on the instrument board or any other suitable part of the vehicle. This switch includes a funnel-shaped member 10 made of an insulating material such as Bakelite. On the middle part of the conical inner surface of said member 10, there is fixed a metallic annular element 11. Funnel-shaped member 10 is rigidly fixed to a plate 12, which constitutes the lid thereof and serves to support it. This plate is provided with a right-angled extension 13 fixed to the end of a spindle 14 carried by support 9. The top part of element 12 which forms the lid is slightly conical, with its apex turned downwardly. On this apex are fixed small metal blades 15 connected to the metallic mass of the vehicle, and, in a general manner, to one end of the circuit to be controlled by the switch. The other end of said circuit is connected by means of a wire or other suitable conductor, shown in dot-and-dash line in Fig. 1, to the metallic ring 11 of member 10.

A metallic ball 17, free to move in the funnel-shaped member 10, remains, under normal conditions, at the bottom of member 10. When said member 10 turns, for instance together with plate 9 as a consequence of an accident overturning the vehicle, about the geometrical axis of spindle 14, and comes in the position shown in dash-and-dot lines in Fig. 3, ball 17, rolling along the inclined wall of member 10, comes to bear upon both metal ring 11 and metallic blades 15, thus closing the circuit to which these parts are connected.

As shown by Fig. 1, spindle 14 is fitted in a screw threaded sleeve 18, extending through both plate 9 and the instrument board, and it can turn with a certain friction inside said sleeve. This spindle 14, which thus extends throughout plate 9 and the instrument board (or any other support) carries, keyed on the end thereof that is turned toward the driver's seat, a milled knob 19. By manually turning this knob, it is possible to turn funnel-shaped member 10 with respect to the support, the amplitude of this angular movement being limited by a stop 20 adapted to cooperate with part 13. In the course of this movement, which brings member 10 in the dash-and-dot position of Fig. 3, ball 17 closes the circuit between ring 11 and blades 15 in the same manner as above described.

As shown by Fig. 1, the electric conductor (shown in dash-and-dot lines) which connects ring 11 to the terminal 16 of the apparatus is fixed to member 10 at the point thereof where it is intersected by the axis of spindle 14, so that this point remains stationary when funnel-shaped member 10 is pivoted. Therefore said conductor does not undergo any displacement when said member 10 is pivoted with respect to support 9, so that this conductor does not risk being deteriorated by the repetition of this movement.

In the embodiment of Figs. 4 and 5, the arrangement of funnel-shaped member 10, with its lid 12 and its ball 17, is the same as above described, but the right-angled extension of lid 12 is journalled about a stud 25 carried by plate 9, and it includes a lateral arm 29. This arm 29 is adapted to cooperate with the end of a sliding rod 30, movable axially in collars 31 carried by plate 9, so that the upper end of said rod 30 can push upwardly arm 29, thus imparting a rotary movement to funnel-shaped member 10 about the axis of pivot 25. The apparatus is manually operated by imparting to a knob 32, carried by the lower end of slide rod 30 an upward movement which brings funnel-shaped member 10 into the position shown in dot-and-dash lines in Fig. 5, for which position ball 17 closes the electric circuit between ring 11 and blades 15.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A gravity switch for controlling an electric circuit, which comprises, in combination, a support adapted to be fixed to the structure to be fitted with said switch, a funnel shaped member pivoted to said support about a horizontal axis at right angles to the axis of said member, a lid for said funnel-shaped member rigid therewith, a metal ring carried by the intermediate part of said funnel-shaped member on the inner face thereof, said lid being of slightly conical shape, with its apex on the inside of said funnel-shaped member, a plurality of radial metal blades carried by said apex, said blades on the one hand and said ring on the other hand being normally electrically insulated, a metallic ball movable in said funnel shaped member adapted electrically to connect said ring with said blades when said funnel-shaped member is inclined about said axis, and means for manually pivoting said funnel-shaped member about said axis so as to bring it into said inclined position.

2. A gravity switch for controlling an electric circuit, which comprises, in combination, a support adapted to be fixed to the structure to be fitted with said switch, a funnel-shaped member pivoted to said support about a horizontal axis at right angles to the axis of said member, a lid for said funnel-shaped member rigid therewith, electricity conducting parts carried by said funnel-shaped member and said lid, respectively, inserted in series in said circuit, said parts being normally electrically insulated from each other, a conductor for connecting the conducting part carried by said funnel shaped member with said circuit, said conductor being fixed to said funnel shaped member at the point where it is intersected by said horizontal axis, a ball of an electricity conducting material movable freely in said funnel-shaped member, adapted electrically to connect said parts with each other when said funnel-shaped member is inclined about said axis, and means for pivoting said funnel-shaped member about said axis so as to bring it into said inclined position.

GEORGES SOULAT.